(12) United States Patent
John et al.

(10) Patent No.: US 7,370,183 B2
(45) Date of Patent: May 6, 2008

(54) BRANCH PREDICTOR COMPRISING A SPLIT BRANCH HISTORY SHIFT REGISTER

(75) Inventors: Lizy K. John, Austin, TX (US); Tao Li, Gainesville, FL (US)

(73) Assignee: Board of Regents, The University of Texas System, Austin, TX (US)

( * ) Notice: Subject to any disclaimer, the term of this patent is extended or adjusted under 35 U.S.C. 154(b) by 283 days.

(21) Appl. No.: 10/822,553

(22) Filed: Apr. 12, 2004

(65) Prior Publication Data

US 2005/0114637 A1 May 26, 2005

Related U.S. Application Data

(60) Provisional application No. 60/462,513, filed on Apr. 11, 2003.

(51) Int. Cl.
*G06F 15/00* (2006.01)
(52) U.S. Cl. .................................... 712/240
(58) Field of Classification Search ............. 712/240, 712/239, 233
See application file for complete search history.

(56) References Cited

U.S. PATENT DOCUMENTS 5,577,217 A * 11/1996 Hoyt et al. ............ 712/200
5,935,241 A * 8/1999 Shiell et al. ............ 712/240
6,108,775 A * 8/2000 Shiell et al. ............ 712/240

OTHER PUBLICATIONS

Li et al, Improving Branch Predictability in Java Processing, Feb. 2001, University of Texas Project Publications.*
Li, T. et al. "Modeling and Evaluation of Control Flow Prediction Schemes Using Complete System Simulation and Java Workloads", Dept. of Electrical and Computer Engineering, the University of Texas at Austin, 10 pages.
Li, T. et al. "Understanding and Improving Operating System Effects in Control Flow Prediction", Dept. of Electrical and Computer Engineering, the University of Texas at Austin (2002), 13 pages.

* cited by examiner

*Primary Examiner*—Tonia L M Dollinger
(74) *Attorney, Agent, or Firm*—Schwegman, Lundberg & Woessner P.A.

(57) ABSTRACT

An apparatus and a system, as well as a method and article, may operate to predict a branch within a first operating context, such as a user context, using a first strategy; and to predict a branch within a second operating context, such as an operating system context, using a second strategy. In some embodiments, apparatus and systems may comprise one or more first storage locations to store branch history information associated with a first operating context, and one ore more second storage locations to store branch history information associated with a second operating context.

9 Claims, 4 Drawing Sheets

BRANCH PREDICTOR COMPRISING A SPLIT BRANCH HISTORY SHIFT REGISTER

PRIORITY CLAIM

This application claims the benefit of priority under 35 U.S.C. § 119(e) to U.S. Provisional Patent Application Ser. No. 60/462,513, titled "Branch Prediction Apparatus, Systems, and Methods", filed on Apr. 11, 2003, incorporated herein by reference in its entirety.

STATEMENT OF GOVERNMENT RIGHTS

The invention was made, at least in part, with a grant from the Government of the United States of America (grant NSF EIA-9807112 from the National Science Foundation). The Government may have certain rights in the invention.

TECHNICAL FIELD

Various embodiments described herein relate generally to program execution, including apparatus, systems, and methods used to predict the outcome of branch operations.

BACKGROUND INFORMATION

Computer system performance may be highly dependent on associated memory system operational efficiency. For example, processing that stalls when data is unavailable can render results at an unacceptably slow rate. Some microprocessors provide aggressive support for Instruction level Parallelism (ILP) and have deep pipelines to keep cycle times low. However, the actual level of ILP and pipelining performance delivered may depend on the accuracy of branch prediction; mispredictions can stall/squash the pipeline.

Many applications include a significant Operating Sytem (OS) component, which can also affect control flow transfer (i.e., branching) in the execution environment. For example, exception-driven, intermittent invocation of OS code may significantly increase branch misprediction in both user and OS (e.g., kernel) code operating contexts. Thus, there is a need to improve the accuracy of program branch prediction mechanisms, especially for systems having a significant OS system component, and/or systems using pipelined processors.

DETAILED DESCRIPTION

Figure 1A:
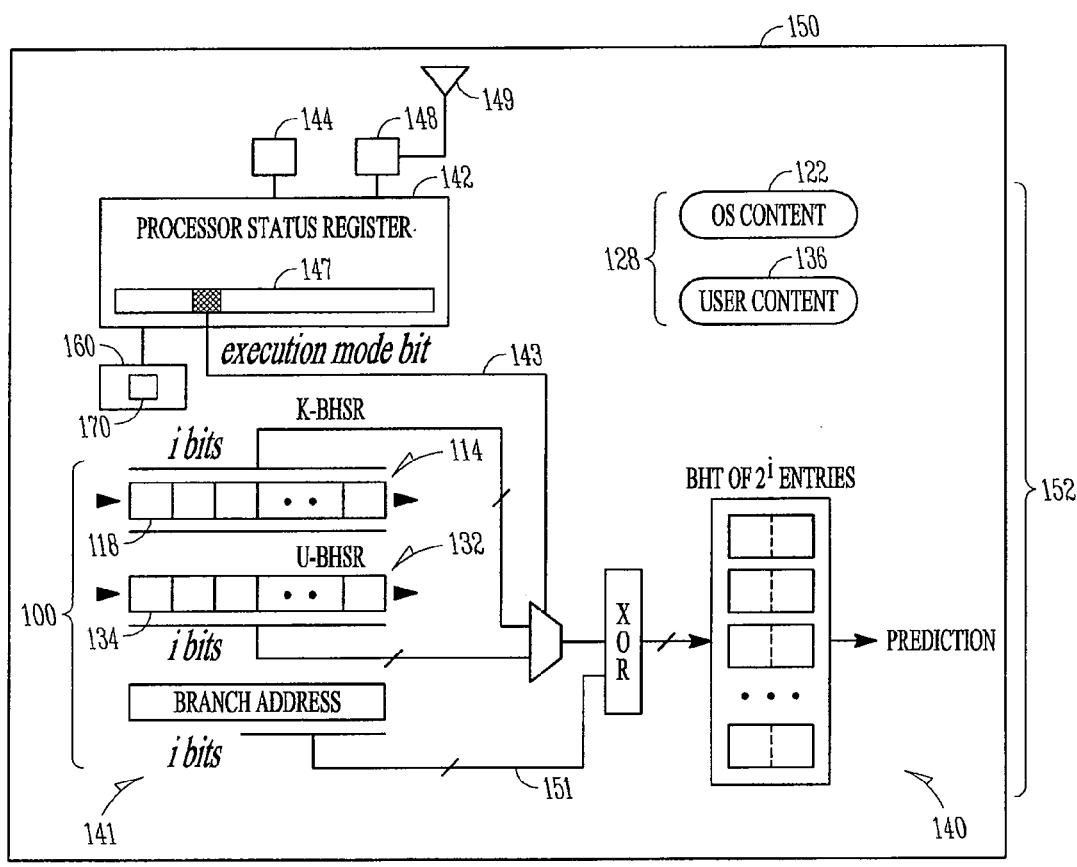
FIGS. 1A, 1B, and 1C are block diagrams of apparatus and systems according to various embodiments.

For the purposes of this document, the following definitions may be observed:

Branch History Information—can be information stored in a branch history shift register or table; Branch History Table—may contain branch history information and may be used to make predictions with respect to appropriate branches for program execution; Operating Context—can include an operating system context (e.g., a kernel context), a user context, and others;

Split Branch History Table—a branch history table that has branch history information separated according to various operating contexts. For example, a split branch history table may have one area set aside to store branch history associated with an OS context, and another area set aside to store branch history associated with a user context;

Storage Location—may be a bit within a register, a register, or a series of registers; may also be one or more locations in a table, as well as one or more locations in a memory, including volatile and nonvolatile memories; and Transceiver—may be a device including a transmitter and a receiver, and may be used in place of either "transmitter" or "receiver" throughout this document. In addition, anywhere the term transceiver is used, "transmitter" and/or "receiver" may be substituted.

Evaluating the suitability of hardware for executing a given program application, as well as with respect to OS performance, is an ongoing process. The three subsystems involved—application (workload), OS, and hardware—are constantly evolving, sometimes quite independently. In particular, it is worthwhile to note the increasing importance of the OS in emerging application environments, since the number of times OS services are invoked by various applications continues to grow.

Recent studies indicate that invoked OS operations may in fact contribute significantly to overall application execution time. For example, in some commercial applications (e.g., databases and web services), OS components have been observed to occupy as much as 55% of the execution time. This may occur because many applications are multi-threaded, exercising the input/output (I/O) subsystem extensively. This trend is likely to continue, and various solutions to reduce the impact of OS components on performance have been sought.

Another aspect of the problem deals with ILP and pipelining performance, which may depend greatly on being able to accurately predict the control flow of a program. Thus, branch prediction, in addition to OS effects, has been studied extensively. For example, branches may have biased behavior such that certain branches are predicted to be usually "taken" or usually "not taken". Branch history table (BHT) counters can exploit this behavior to predict future outcomes for a given branch. However, when branches showing different biases are mapped into the same entry of the predictor table, aliased branches update BHT counters with different directions, leading to aliasing mispredictions. OS operations may complicate the situation. For example, the OS may affect control flow predictability by introducing additional user/OS branch aliasing in branch predictor tables. In some benchmark tests, kernel code operation has been noted to nearly double misprediction rates.

To summarize, user/OS branch aliasing can significantly affect (and reduce) branch prediction accuracy. In some circumstance, this may be attributed to exception-driven and intermittent kernel branch execution that results in BHSR (branch history shift register) branch history information that is inaccurate. Moreover, user and kernel branches may have a different bias distribution, which in turn spreads user-kernel branch aliasing references across a wide range of BHT entries. These observations motivate the need for OS-aware branch prediction techniques.

To discover a mechanism that may alleviate the destructive impact of OS branch execution on branch predictability, consider that during the initial period of a context switch, both user and kernel history patterns may coexist in history capture structures. In Gshare (and other correlation based predictors), shift registers (e.g., BHSRs) may operate to capture correlations between branches and/or branch history tables (BHTs). One solution to the challenges described may be to use separate shift registers to individually keep track of branch correlation; another solution may be to utilize separate BHTs.

While the OS-aware mechanisms described herein may be illustrated in the context of a Gshare predictor for reasons of simplicity, it should be noted that various embodiments can be applied to other correlation-based predictors as well. In fact, the various embodiments disclosed herein may provide solutions that one can incorporate into almost any predictor mechanism to alleviate the impact of the OS activity on control flow prediction. For more information on Gshare branch predictors, as well as other prediction mechanisms, please see the following, incorporated herein by reference in their entirety: *Combining Branch Predictors*, S. McFarling, *WRL Technical Note TN-36, Digital Equipment Corporation, June,* 1993; and *The Interaction of Architecture and Operating System Design*, T. E. Anderson, et al., Proceedings of the Fourth International Conference on Architectural Support for Programming Languages and Operating Systems, pgs. 108-120, 1991.

Thus, various embodiments described herein may advocate separating branch prediction logic for user and kernel modes to reduce, and perhaps eliminate interference between the two. In some embodiments, this approach may be integrated into existing prediction schemes without significant logic complication.

Figure 1B:
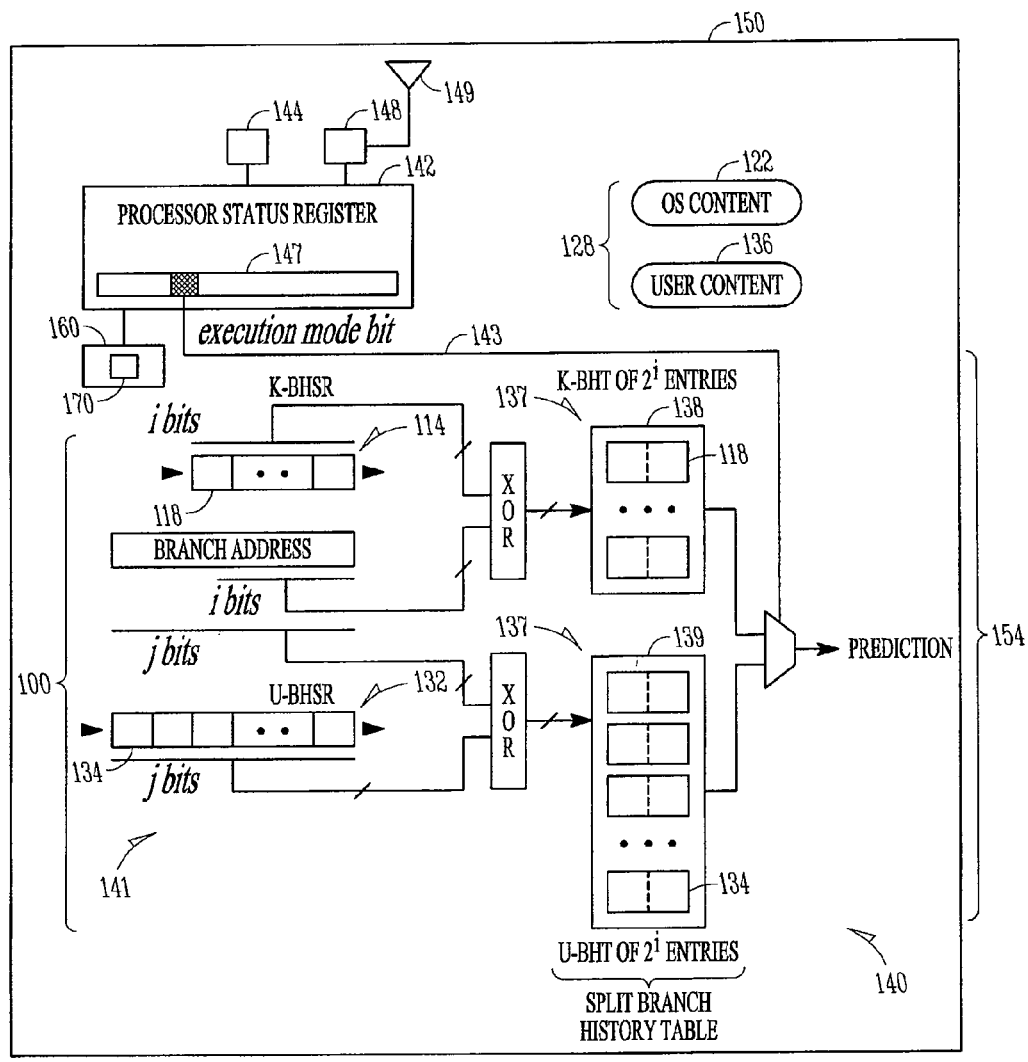
Figure 1C:
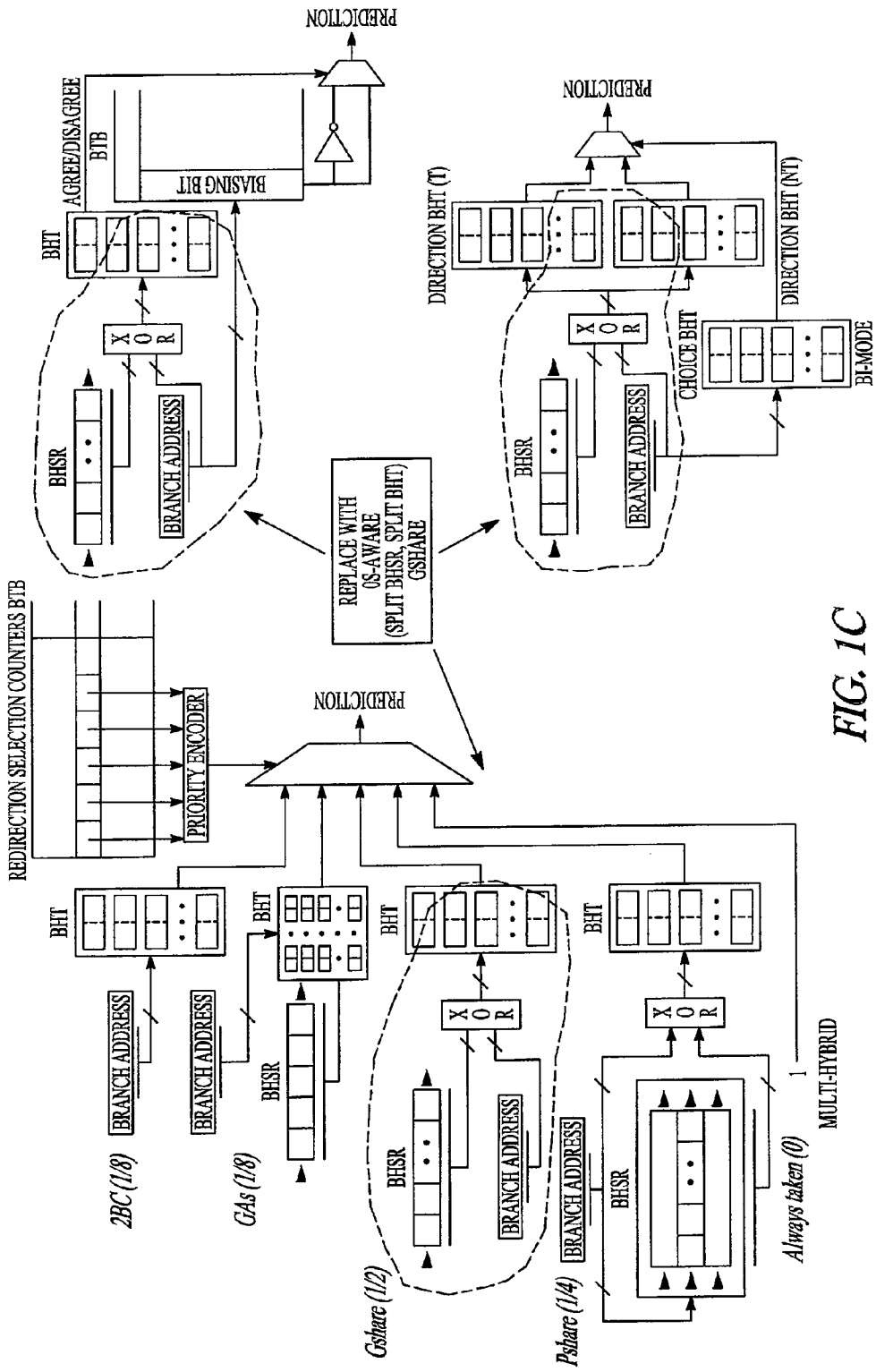

FIGS. 1A, 1B, and 1C are block diagrams of apparatus and systems according to various embodiments. FIG. 1A illustrates some embodiments of the invention using a split or separated correlation history approach. FIG. 1B illustrates some embodiments of the invention utilizing a split correlation history approach, combined with a split or separated BHT. FIG. 1C illustrates some embodiments of the invention where an OS-Aware Gshare branch predictor having a split BHSR and split BHT is substituted for various components of the Multi-Hybrid, Agree, and Bi-Mode branch prediction apparatus.

In some embodiments, the apparatus 100 may comprise a first storage location 114 to store branch history information 118 associated with a first operating context 122 (e.g., an OS context, including a kernel context) selected from a plurality of operating contexts 128. The plurality of operating contexts 128 may in turn be selected to form a preselected grouping of operating contexts 128. In some embodiments, the apparatus 100 may also have a second storage location 132 to store branch history information 134 associated with a second operating context 136 (e.g., a user context) selected from the plurality of operating contexts 128.

Referring specifically to FIG. 1B, it is to be noted that the apparatus 100 may also make use of a split BHT 137 including a first storage location 138 to store branch history information 118 associated with the first operating context 122 (e.g, an OS context, including a kernel context) selected from a plurality of operating contexts 128 (e.g., a preselected plurality). The apparatus 100 may also include a second storage location 139 as a portion of a split BHT 137 to store branch history information 134 associated with a second operating context 136 (e.g., a user context) selected from the plurality of operating contexts 128. In either case (i.e., considering the apparatus 100 in FIG. 1A or 1B), the first and second storage locations 114, 138 and 132, 139, respectively, may comprise a single location or a set of locations, such as a register, a memory location, a group of registers, and/or a group of memory locations, or combinations thereof.

Thus, in some embodiments, and apparatus 100 may comprise one or more first storage locations 114 to store branch history information 118 associated with a first operating context 122, and one or more second storage locations 132 to store branch history information 134 associated with a second operating context 136. The first and second operating contexts 122, 136 may be selected from a preselected plurality or grouping of operating contexts 128. For example, in some embodiments, the preselected plurality of operating contexts 128 may include at least one of a user context, an operating system context, and other contexts.

In some embodiments, the first and second storage locations 114, 132 may be included in first and second designated portions of a memory 141, respectively. The designated portions of the memory 141 may, or may not overlap. As noted previously, the first and second storage locations 114, 132 may each comprise one or more registers, as well as one or more bits within a single register.

In some embodiments, the apparatus 100 may include a BHT 137 having a dynamically switched input 143 coupled to at least one bit included in the first storage location and at least one bit included in the second storage location. The dynamically switched input 143 can be switched according to an indication of the current operating context included in the preselected plurality of operating contexts provided by a processor status register (PSR) 147. The split BHT 137 may also be capable of receiving an indication 151 of a selected branch address modified by the indication of the current operating context.

In some embodiments, the apparatus 100 may include a split BHT 137 having a first portion to receive at least one bit included in the first storage location 114 and a second portion to receive at least one bit included in the second storage location 132. The apparatus 100 may also include a PSR 147 to provide an indication of a current operating context including the preselected plurality of operating contexts 128 to a prediction resource coupled to the split BHT 137.

In some embodiments, an apparatus 100 may include a first storage location (or a first set of storage locations) 114 to store branch history information associated with an execution of a plurality of instructions, such as operating system instructions; and a second storage location (or a second set of storage locations) 132 to store branch history information associated with an execution of a plurality of instructions, such as user instructions. The first and second storage locations 114, 132 may be located in a single physical location, or in separate locations.

The first storage location (or first set of storage locations) 114 may be used to store branch history information associated with a first operating context 122, and the second storage location (or second set of storage locations) 132 may be used to store branch history information associated with a second operating context 136. The first and second operating contexts 122, 136 may be selected from any number of contexts. In some embodiments, the apparatus 100 may include a BHT 137 having a dynamically switched input 143 coupled to the first storage location 114 and the second storage location 132. Other embodiments may be realized.

For example, a system 140 may include an apparatus 100, similar to or identical to the apparatus 100 described previously, as well as a processor 142 to execute a plurality of instructions within a first operating context 122 and a second operating context 136, each selected from the plurality of operating contexts 128. The first storage location 114 may be used to store branch history information associated with the first operating context 122, and the second storage location 132 may be used to store branch history information associated with the second operating context 136.

In some embodiments, the system 140 may include a memory 141 coupled to the processor 142, the memory 141 including the first storage location 114 and the second storage location 132. The memory 141, in turn, may include one or more shift registers. The system 140 may include a PSR 147 (e.g., included in the processor 142) to provide an indication of a current operating context included in the plurality of operating contexts. The system 140 may also include a split BHT 137 including the first storage location 114 and the second storage location 132, wherein the split BHT 137 is coupled to the processor 142.

The processor 142 may in turn comprise a microprocessor, a digital computer, a digital signal processor, or a hybrid (digital/analog) computer. The processor 142 may be coupled to a network adapter 144 and/and or a wireless transceiver 148. The system 140 may include multiple processors 142, including one or more pipelined processors. The transceiver 148 may be coupled to an energy conduit 149, including any type of device or apparatus having the capability to transmit and/or receive energy to and/or from space. Examples of such energy conduits include antennas, infra-red transmitters, infra-red receivers, photo-emitters (e.g., light emitting diodes), photo-receptors (e.g., a photocell), and charge-coupled devices, among others.

In some embodiments, a device 150, such as a computer, a memory system, a magnetic or optical disk, some other storage device, and/or any type of electronic device or system, may comprise a machine-accessible medium such as a memory 160 (e.g., a memory including an electrical, optical, or electromagnetic conductor) having associated data 170 (e.g. computer program instructions), which when accessed, results in a machine performing various activities. These activities may include, for example, accessing branch history information associated with a current operating context from a plurality of designated branch history storage locations, wherein each one of the plurality of designated branch history storage locations is associated with a corresponding plurality of operating contexts including the current operating context.

It is noted that in the apparatus 100 and system 140 described herein may be implemented in the form of a Gshare predictor. The disclosed embodiments can be applied to other correlation-based predictors as well. For example, a Gshare predictor with split correlation history shift registers (e.g., a split BHSR predictor) 152 can be seen in FIG. 1A. The split BHSR predictor 152 may operate so that two dedicated BHSRs (i.e., U-BHSR for user context and K-BHSR for kernel context) are used to gather branch correlation patterns and to generate BHT indexing. By using K-BHSR for kernel branches, the split BHSR predictor may overcome the loss of branch history patterns in kernel mode. The split BHSR predictor 152 may operate to dynamically switch between BHSRs (e.g., the U-BHSR and the K-BHSR) when a context switch occurs, preventing BHT indexing ambiguity during the initial stages of a context switch.

The proposed split BHSR predictor 152 aims to preserve accurate BHT counter indexing during a context switch. However, user/OS aliasing may still occur when user and kernel branches have the same XORed (exclusive-ORed) global history pattern, but opposite biases. Due to different branch bias distributions, user and kernel branches can update BHT counters in different manners. To reduce destructive user/OS branch aliasing in BHT, the split BHT 137 for user and kernel code, which yields a split BHT predictor 154, can be used. This split BHT predictor 154 may reduce or even eliminate destructive user/OS aliasing by using separate correlation and history information with respect to user mode and kernel mode. It is also observed that when BHTs are split into user and kernel parts, the kernel BHT can be smaller than the user BHT because there may be fewer active branch sites in kernel.

Separating kernel branches can be accomplished at run time by using the PSR 147. In some embodiments, a set of PSR bits associated with a microprocessor may be used to record and identify kernel-user execution mode or privilege level. For example, a MIPS RI 10000 processor may use the KSU field in its PSR to identify the current execution mode, and the Intel® IA-64 Itanium processor may use its PSR.cpl field to determine one of four privilege levels (e.g., levels 0-3).

The corresponding PSR field can be used to select the appropriate predictor. For example, at runtime, instructions from a fetch unit may be filtered into an active part of the prediction resource (e.g., user or kernel, depending on the execution mode).

As mentioned previously, OS-aware prediction techniques may be integrated with other predictors. For example, Multi-Hybrid, Agree, and Bi-Mode schemes do contain mechanisms tailored for branches with heterogeneous characteristics and/or de-aliasing. All these predictors may contain a Gshare predictor and/or Gshare indexing. To integrate the proposed mechanisms, a conventional Gshare component may be replaced with the proposed OS-aware (split-BHSR Gshare) split BHSR predictor 152 and/or the (split Gshare) split BHT predictor 154. For more information on the Multi-Hybrid, Agree, and Bi-Mode prediction schemes, please see the following references, incorporated herein by reference in their entirety: *Using Hybrid Branch Predictors to Improve Branch Prediction Accuracy in the Presence of Context Switches*, M. Evers et al., Proceedings of the 23rd Annual International Symposium on Computer Architecture, pgs. 3-11, 1996; *The Agree Predictor: A Mechanism for Reducing Negative Branch History Interference*, E. Sprangle et al., Proceedings of the 24th Annual International Symposium on Computer Architecture, pgs. 284-291, 1997; and *The Bi-Mode Branch Predictor*, C. C. Lee et al., Proceedings of the 30th Annual IEEE/ACM International Symposium on Microarchitecture, pgs. 4-13, 1997.

Some embodiments, such as those having a split BHSR predictor 152 (see FIG. 1A), may be constructed so as to separate the BHSRs. In some embodiments, including those having a split BHT predictor 154 (see FIG. 1B), partitioning of the BHT 137 between user code and OS code or kernel code may occur statically, or may happen dynamically (e.g., as needed).

The apparatus 100, storage locations 114, 132, 138, 139, branch history information 118, 134, operating contexts 122, 136, plurality of operating contexts 128, split BHT 137, system 140, memories 141, 160, processor 142, input 143, network adapter 144, PSR 147, transceiver 148, energy conduit 149, device 150, indication 151, split BHSR predictor 152, split BHT predictor 154, and data 170 may all be characterized as "modules" herein. Such modules may include hardware circuitry, and/or one or more processors and/or memory circuits, software program modules, including objects and collections of objects, and/or firmware, and combinations thereof, as desired by the architect of the apparatus 100 and the system 140, and as appropriate for particular implementations of various embodiments.

It should also be understood that the apparatus and systems of various embodiments can be used in applications other than desktop computers and workstations, and thus, the various embodiments disclosed herein are not to be so limited. The illustrations of an apparatus 100 and system 140 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as sub-components within a variety of electronic systems, such as televisions, cellular telephones, personal computers, personal digital assistants (PDAs), workstations, radios, video players, vehicles, and others.

Figure 2:
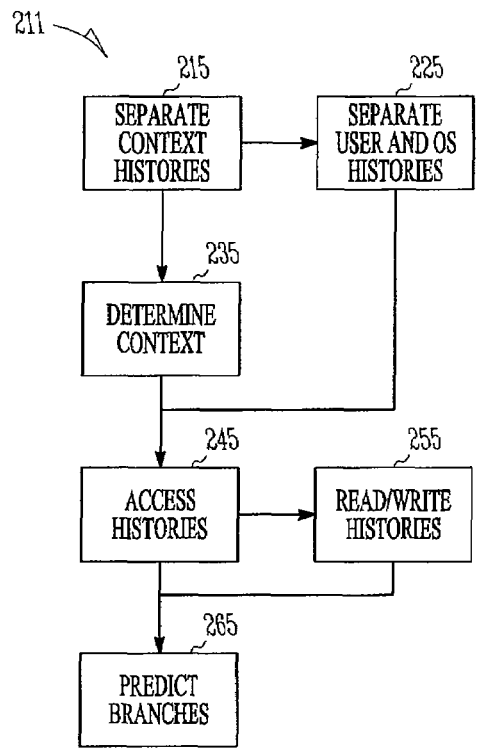
FIG. 2 is a flow chart illustrating several methods according to various embodiments.

FIG. 2 is a flow chart illustrating several methods according to various embodiments. For example, in some embodiments of the invention, a method 211 may include separating branch history information according to various operating contexts at block 215, such as separating branch history information according to an OS context (e.g., a kernel context) and a user context at block 225. Other operating contexts may also be used as a basis for separation.

The method 211 may also include determining the current operating context from among various operating contexts, including a preselected grouping of operating contexts, at block 235. For example, the method 211 may include determining the current operating context based on a type of instruction previously executed.

The method 211 may continue with accessing branch history information associated with the current operating context from a plurality of designated branch history storage locations (e.g., registers and/or BHTs, or a split BHT), wherein each one of the plurality of designated branch history storage locations may be associated with a corresponding plurality of operating contexts (e.g., OS contexts, user contexts, etc.) including the current operating context, at block 245. Thus, for example, the method 211 may include storing branch history information associated with a first operating context included in the plurality of operating contexts in a first location (or set of locations) included in the plurality of designated branch history storage locations. The method 211 may also include storing branch history information associated with a second operating context included in the plurality of operating contexts in a second location (or set of locations) included in the plurality of designated branch history storage locations. The first and second locations may be included in a pair of registers. In some embodiments, several (e.g., each) of the plurality of designated branch history storage locations may be included in a substantially contiguous series of memory locations forming an addressable memory block.

Accessing the histories may include reading (e.g., retrieving) and/or writing (e.g., storing) the histories at block 255. The method 211 may also include predicting branches at block 265. Thus, for example, the method 211 may include determining a course of action based on a condition of branch history information associated with a selected context, further associated with a selected one of the plurality of designated branch history storage locations.

In some embodiments, a method 211 may comprise separating a first branch history from a second branch history at block 225. The method 211 may include accessing the first branch history (e.g., associated with a first operating context, perhaps including a plurality of user instructions), and accessing a second branch history (e.g., associated with a second operating context, perhaps including the execution of a plurality of operating system instructions) at block 245.

In some embodiments, the method 211 may further include predicting a branch within the first operating context based upon information stored in the first branch history at block 265. The method 211 may also include predicting a branch within the second operating context based upon information stored in the second branch history at block 265.

In some embodiments, the method 211 may include separating a first branch history associated with a first operating context from a second branch history associated with a second operating context at block 215. The method 211 may also include predicting a branch within a first operating context using a first strategy, and predicting a branch within a second operating context using a second strategy at block 265. In some embodiments, the first operating context may comprise a user context, and the second operating context may comprise an operating system context. The first strategy may include accessing a branch history associated with a user context, and the second strategy may include accessing a branch history associated with an operating system context.

It should be noted that the methods described herein do not have to be executed in the order described, or in any particular order. Moreover, various activities described with respect to the methods identified herein can be executed in serial or parallel fashion. For the purposes of this document, the terms "information" and "data" may be used interchangeably. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well-known to those skilled in the art, such as application program interfaces or inter-process communication techniques, including remote procedure calls. The teachings of various embodiments are not limited to any particular programming language or environment, including Hypertext Markup Language (HTML) and Extensible Markup Language (XML). Thus, other embodiments may be realized.

Figure 3:
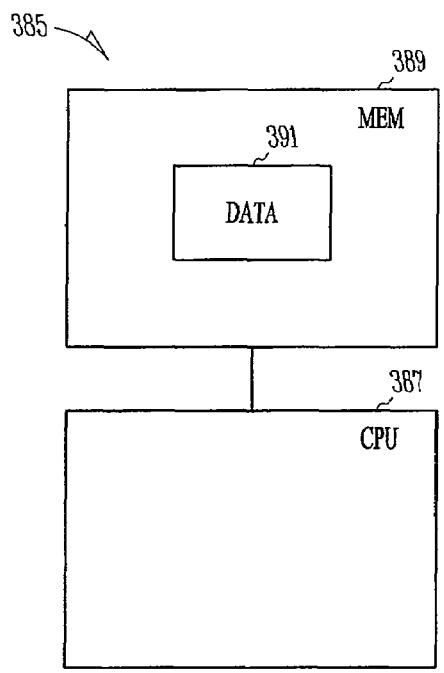
FIG. 3 is a block diagram of an article according to various embodiments.

FIG. 3 is a block diagram of an article 385 according to various embodiments, such as a computer, a memory system, a magnetic or optical disk, some other storage device, and/or any type of electronic device or system. The article 385 (similar to or identical to the device 150 of FIGS. 1A and 1B) may comprise a processor 387 (similar to or identical to the processor 142 of FIGS. 1A and 1B) coupled to a machine-accessible medium such as a memory 389 (e.g., a memory including an electrical, optical, or electromagnetic conductor, similar to or identical to the memory 141 of FIGS. 1A and 1B) having associated information 391

(e.g., computer program instructions, and/or other data, similar to or identical to the data 170 of FIGS. 1A and 1B)), which when accessed, results in a machine (e.g., the processor 142, 387) performing such actions as accessing branch history information associated with a current operating context from a plurality of designated branch history storage locations, wherein each one of the plurality of designated branch history storage locations is associated with a corresponding plurality of operating contexts including the current operating context.

Other actions may include determining the current operating context based on a type of instruction previously executed, as well as storing branch history information associated with a first operating context included in the plurality of operating contexts in a first location included in the plurality of designated branch history storage locations, and storing branch history information associated with a second operating context included in the plurality of operating contexts in a second location included in the plurality of designated branch history storage locations. Several (e.g., each one) of the plurality of designated branch history storage locations may be included in a substantially contiguous series of memory locations forming an addressable memory block.

Further actions may include predicting a branch within a first operating context using a first strategy, and predicting a branch within a second operating context using a second strategy. Additional actions may include separating a first branch history associated with the first operating context from a second branch history associated with the second operating context. In some embodiments, the first operating context may include a user context, and the second operating context may include an operating system context. As noted previously, the first strategy may include accessing a branch history associated with a user context, and the second strategy may include accessing a branch history associated with an operating system context.

Implementing the apparatus, systems, and methods described herein may result in reducing the amount of user/OS branch aliasing experienced during execution of various applications without adding extra hardware for branch de-aliasing. As a consequence, the number of resources consumed may be reduced.

For example, testing has demonstrated the potential, using a 32,000 entry BHT, of an OS-aware Gshare-based split BHSR predictor and split BHT predictor to reduce misprediction by 34% and 22%, respectively. OS-aware split BHSR and split BHT Multi-Hybrid, Agree and Bi-Mode predictors may yield up to 23%, 27% and 9% prediction accuracy improvement respectively. Other advantages that can be obtained by implementing various embodiments may be observed by referring to *Understanding and Improving Operating System Effects in Control Flow Prediction*, by Li, et al., Proceedings of the Tenth International Conference on Architectural Support for Programming Languages and Operating Systems, October 2002, incorporated herein by reference in its entirety.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A branch prediction apparatus, comprising:
an agree branch predictor having at least one split branch history shift register comprising at least a first branch history shift register to store correlated branch history information associated with an execution of a plurality of user instructions, and at least a second branch history shift register to store correlated branch history information associated with an execution of a plurality of operating system instructions, wherein the first branch history shift register and the second branch history shift register are separated.

2. The branch prediction apparatus of claim 1, further comprising:
a Gshare branch predictor comprising the first branch history shift register and the second branch history shift register.

3. A branch prediction apparatus, comprising:
an agree branch predictor having at least one split branch history Gshare branch predictor comprising a first branch history shift register to store correlated branch history information associated with a first operating context selected from a preselected plurality of operating contexts, and a second branch history shift register included in the Gshare branch predictor, wherein the second branch history shift register is to store correlated branch history information associated with a second operating context selected from the preselected plurality of operating contexts.

4. A branch prediction apparatus, comprising:
a multi-hybrid branch predictor having at least one split branch history shift register comprising at least a first branch history shift register to store correlated branch history information associated with an execution of a plurality of user instructions, and at least a second branch history shift register to store correlated branch history information associated with an execution of a plurality of operating system instructions, wherein the first branch history shift register and the second branch history shift register are separated.

5. The branch prediction apparatus of claim 4, further comprising:
a Gshare branch predictor comprising the first branch history shift register and the second branch history shift register.

6. A branch prediction apparatus, comprising:
a multi-hybrid branch predictor having at least one split branch history Gshare branch predictor comprising a first branch history shift register to store correlated branch history information associated with a first operating context selected from a preselected plurality of operating contexts, and a second branch history shift register included in the Gshare branch predictor, wherein the second branch history shift register is to store correlated branch history information associated with a second operating context selected from the preselected plurality of operating contexts.

7. A branch prediction apparatus, comprising:
a bi-mode branch predictor having at least one split branch history shift register comprising at least a first branch history shift register to store correlated branch history information associated with an execution of a plurality of user instructions, and at least a second branch history shift register to store correlated branch history information associated with an execution of a plurality of operating system instructions, wherein the first branch history shift register and the second branch history shift register are separated.

8. The branch prediction apparatus of claim 7, further comprising:
a Gshare branch predictor comprising the first branch history shift register and the second branch history shift register.

9. A branch prediction apparatus, comprising:
a bi-mode branch predictor having at least one split branch history Gshare branch predictor comprising a first branch history shift register to store correlated branch history information associated with a first operating context selected from a preselected plurality of operating contexts, and a second branch history shift register included in the Gshare branch predictor, wherein the second branch history shift register is to store correlated branch history information associated with a second operating context selected from the preselected plurality of operating contexts.

* * * * *